United States Patent [19]
Faedi et al.

[11] 4,431,955
[45] Feb. 14, 1984

[54] STEP MOTOR CONTROL CIRCUIT

[75] Inventors: Leonardo Faedi, Mazzo di Rho; Maurizio Bertoli, Milan, both of Italy

[73] Assignee: Honeywell Information Systems Italia, Milan, Italy

[21] Appl. No.: 326,783

[22] Filed: Dec. 2, 1981

[30] Foreign Application Priority Data

Dec. 18, 1980 [IT] Italy .............................. 26747 A/80

[51] Int. Cl.³ ............................................ H02K 29/04
[52] U.S. Cl. ..................................... 318/696; 318/685
[58] Field of Search ................................ 318/696, 685

[56] References Cited

U.S. PATENT DOCUMENTS

| | | | |
|---|---|---|---|
| 3,750,000 | 7/1973 | Bruckner et al. | 318/696 |
| 3,824,440 | 7/1974 | McIntosh | 318/696 |
| 4,223,260 | 9/1980 | Beer et al. | 318/696 |
| 4,358,725 | 11/1982 | Brendemulhl | 318/696 |

Primary Examiner—J. V. Truhe
Assistant Examiner—Saul M. Bergmann
Attorney, Agent, or Firm—Nicholas Prasinos

[57] ABSTRACT

Step motor control circuit of the "current chopping" type where, according to the required operative conditions, both the energization current level and the "chopping" frequency is varied. When the current level applied to the motor phases is high, a relatively low chopping frequency is used and, on the contrary, when the current level is low a relatively high chopping frequency is used. Particularly, this allows the use of chopping ultrasonic frequency for the holding operative condition of the motor, where a low energization current level suffices, without causing unacceptable power losses in the current switching components. This has the advantage of eliminating under such condition, the motor noise due to the pulsating electrodynamic actions to which the motor is subjected.

3 Claims, 5 Drawing Figures

STEP MOTOR CONTROL CIRCUIT

BACKGROUND OF THE INVENTION

1. Field of the Invention

The present invention refers to a control circuit for current flowing in step motor phase windings.

2. Description of the Prior Art

Current control systems of the so-called current chopping type are known; they permit high performances in step motors by keeping the energization current in the phases close to predetermined values for the whole energization time interval of such phases. Substantially such systems connect intermittently the phase windings to a voltage source, interrupting the connection when the current reaches a predetermined value and allowing the current established in the winding to flow in a recycle path, thus decreasing with a time constant determined by the recycle path impedance which connects the windings again to the voltage source after a predetermined interval, or when the circulating current has decreased to a second predetermined value. This process continues for the whole duration of the phase's energization. Such systems are described for example in U.S. Pat. Nos. 4,107,593 and 3,812,413.

Within improved systems of the same type the predetermined value for the energizing current may be varied according to the operation requirements. When a high energizing power is needed, as for example during the motor starting or stopping phases, the imposed current level is high. On the other hand during the motion phase at constant speed or when the energizing current function is only to hold the rotor in a stable position, the current level is low. An example of such a system is described in the Italian patent application No. 24734 A/80 of the same applicant as the instant application. The current chopping control system, used in step motors, have the disadvantage of causing motor vibrations with a frequency determined by the "chopping" frequency. This is due to the intermittance of the electrodynamical actions in the motor electromagnetic structures. If the "chopping" frequency utilized is within the audio-frequency range electrical noise is generated. In practice, nonetheless, the motor is required to operate within such frequency ranges. In fact for very low "chopping" frequency, in the range of a few tens of Hz, the control action on the energizing current is ineffective; while for frequency higher than 15 KHz the switching losses in the switching devices (generally power transistors) become so important as to greatly reduce the performances of the whole control system and to require the use of expensive switching transistors able to dissipate the switching power losses.

The present invention overcomes such disadvantages by using a chopping criterion in which the chopping frequency is selected as an inverse function of the predetermined value of the energization current. In fact, it is known that the switching power losses in switching transistors are substantially:

$$P = K \cdot I \cdot f \cdot v.$$

Where
K = proportion coefficient
I = switched current
f = switching frequency
v = switched voltage.

Once the maximum power to be dissipated is established, it is possible to vary f inversely to current while keeping I and P within the allowed limits. Several advantages are obtained by the use of such criterion. They are as follows:

a. the rational use of switching transistors within safety conditions and with constant dissipated power;

b. the possibility of using low cost transistors and simple and inexpensive control circuits;

c. the possibility of operating at least within working conditions of the step motors, at ultrasonic switching frequencies, so that unwanted noise is eliminated.

These advantages are particularly useful in the field of mosaic serial printers where step motors are widely used. In such printers a step motor is used to move a printing carriage. The use of step motors allows the carriage to be stopped at predetermined holding positions and held firmly in such positions, and to intermittently move from a holding position to another one by accelerating, driving at constant speed and decelerating. During the displacement from a holding position to another one, the printing operations take place. The printing operations involve noise generation. Such noise, with predominant frequency in the order of thousand Hz, exceeds and masks any noise generated by electrodynamical actions within the step motor. However, when the carriage is in holding state, no printing operation occurs and the electrodynamic actions within the step motor cause a noise with commutation frequency of about some thousands Hz (5-6 KHz). This is detected by the operator as a very annoying whistle.

OBJECTS OF THE INVENTION

It is a primary object of the invention to provide an improved step motor control circuit.

It is still another object of the invention to provide a step motor circuit which eliminates unwanted noise.

SUMMARY OF THE INVENTION

The foregoing objects are achieved according to one embodiment of the invention where such noise inconvenience is avoided, because during the energization condition (which holds the step motor in a stable position) an ultrasonic "chopping" frequency of the winding energization current in the range of about 15-20 KHz is utilized.

BRIEF DESCRIPTION OF THE DRAWINGS

The novel features which are characteristic of this invention are set forth with particularity in the appended claims. The invention itself, however, both as to its organization and operation together with further objects and advantages thereof may be best understood by reference to the following description taken in connection with the accompanying drawings in which:

DETAILED DESCRIPTION OF THE PREFERRED EMBODIMENT

Figure 1:
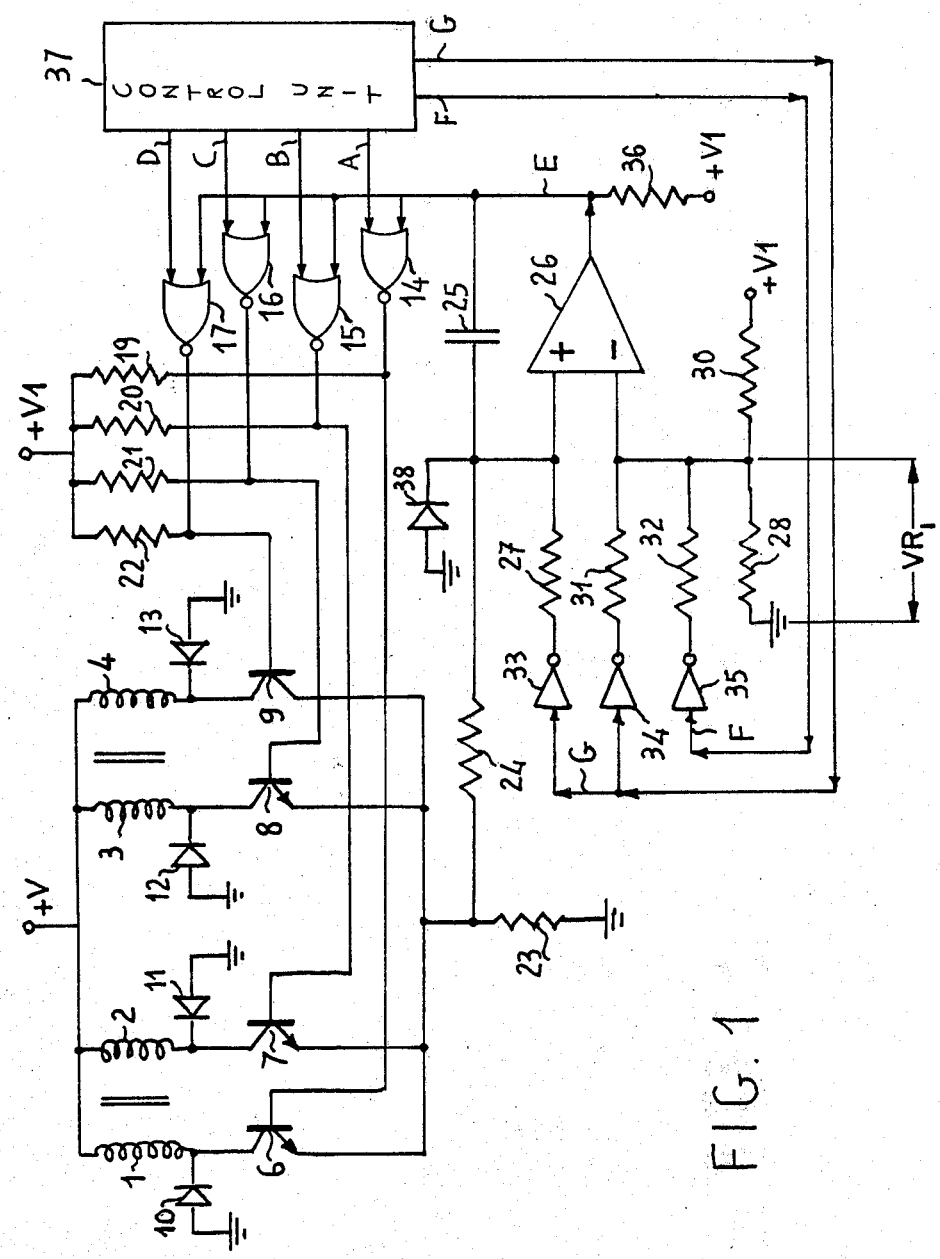
FIG. 1 shows a first step motor energization current control circuit using variable frequency "chopping" according to the invention.

Referring to FIG. 1 there is shown a control circuit for driving the windings 1, 2, 3, 4 of a four-phase step motor. The phases are magnetically coupled in pairs. A winding end is connected to a continuous voltage power supply +V. The other end of each of the windings 1, 2, 3, 4 is connected to the collector of a switching transistor 6, 7, 8, 9 respectively. The emitter of the four switching transistors is connected to ground through a resistor 23 having low resistance value, typically 0.5Ω. A recycle and demagnetization diode 10, 11, 12, 13 respectively, is connected to each of the four switching transistor collectors. The diodes have their anode connected to ground. Therefore, when the current in phase 1, which flows from power supply +V to ground, is switched off owing to the switching off of transistor 6, the magnetic coupling between phase 1 and phase 4 induces a EMF in phase 2 and a recycle induced current which flows from ground to power supply +V through diode 11. The other diodes operate in the same way.

The base of the four transistors 6, 7, 8, 9 is respectively connected to the output of four two-input NOR gates 14, 15, 16, 17 which are "open collector" type; additionally they are connected to a continuous power supply +V$_1$ of suitable value through resistors 19, 20, 21, 22 respectively.

A control signal A, B, C, D coming from a suitable control unit 37, is respectively applied on a first input of the NOR gates. The description of such control unit is omitted because it is beyond the scope of the invention and its possible embodiments are well-known to people skilled in the art. On the second input of the NOR gates a second control signal E is applied, which signal is generated by a phase energization current control circuit which will be considered infra.

The sequence and the phase relation among control signals A, B, C, D are beyond the scope of the invention: it is only to bear in mind that by a suitable choice of the sequence and phase relation of the control signals it is possible, through NOR 14, ... 17, to control the selective energization of the step motor phases, determining the operative conditions of rest, or movement in one direction or in the other one. Thus a logical signal 0 applied to both the inputs of NOR 14 switches on transistor 6 while a logical signal 1 applied to one or both the inputs of NOR 14 switches off transistor 6. Likewise for the other transistors 7, 8, 9.

Now the control circuit of the energization current, where the invention resides will be considered. It comprises the already-mentioned resistor 23, a comparator 26 of the "open collector" type, a capacitive feedback element 25 (330pF), a group of resistors 31 (100Ω), 32 (2.2 KΩ), 28 (33 KΩ), 30 (1 KΩ), generating a reference voltage, a couple of resistors 24 (82 KΩ), 27 (20 KΩ) and three control NOT elements 33, 34, 35 of the "open collector" type. (The preferred resistance and capacity values, used in the described circuital embodiment, are indicated in parenthesis.) Resistor 24 is connected between the emitters of transistors 6, 7, 8, 9 and the direct input of comparator 26. Capacitor 25 is connected between the output and the direct input of the comparator. The comparator output is connected, through a "pull up" resistor 36, to a suitable power supply +V$_1$. It is further connected to the second input of NOR gates 14, 15, 16, 17. This connection is used to apply the control signal E to such inputs. Resistor 30 is connected between the inverting input of the comparator and a suitable voltage supply +V$_1$. Resistor 28 is connected between the inverting input of the comparator and ground. Resistors 32 and 31 are connected between the inverting input of the comparator and the output of NOT 35 and 34 respectively. Resistor 27 is connected between the direct input of the comparator and the output of NOT 33. NOT gate 35 receives in input a control logical signal F and NOT 34, 33 receives in input a control signal G. Control signals F and G are generated by control unit 37. When control signals F and G are at logical level 0 the output of inverters 33, 34, 35 is virtually disconnected from ground and therefore resistors 27, 31, 32 have one virtually insulated end. In such conditions, a positive reference voltage VR$_1$, determined by the voltage divider comprised of resistors 28, 30, is applied to the inverting input of comparator 26. The non-inverting input of the comparator is connected to the intermediate point of network RC, comprises of two series resistors 23 and 24 and of capacitor 25.

Now the energization current control circuit operation for such condition of the control signals F and G will be considered. In rest condition the motor phases are de-energized (all controls A, B, C, D are at logical level 1) and no current flows in resistor 23. Direct input of comparator 26 is virtually at ground while the inverting input is at the positive voltage VR$_1$. Therefore, the comparator output, which is of the "open collector" type, is connected to ground and the output signal E from comparator is at logical level 0. It is known that the step motor control is preferably effected by pairs of phases; now when a pair of phases is energized by lowering two of the four signals A, B, C, D, to logical level 0, a current, equally distributed between two phases, begins to flow in resistor 23 increasing with exponential law determined by the constant time of the current path. A voltage drop proportional to such current is therefore established in resistor 23. Such voltage is applied to the direct input of the comparator with a slight hysteresis due to the integrating effect of network RC which is formed by resistor 24 and capacitor 25. When the voltage at the direct input equals the reference voltage VR$_1$, comparator 26 switches raising the output at voltage level +V$_1$ and applying a signal E at logical level 1 to the second input of NOR 14, 15, 16, 17 so that the previously switched-on transistors are switched off. The current flowing in resistor 23 is therefore interrupted. At the same time voltage V$_1$ at the comparator output is transferred to the direct input and holds the comparator in its new state. Capacitor 25, practically discharged, begins to charge through resistors 23 and 24 and the voltage applied to the direct input decreases with exponential law and with time constant RC determined by the values of capacitor 25 and of two resistors 23 and 24 series connected.

When the voltage value applied to the direct input lowers just to equal the value of reference voltage VR$_1$, comparator 26 commutates, connecting the output to ground and therefore applying a signal E, at logical level 0, to NOR 14, 15, 16, 17 and controlling the energization of two phases, together with a pair of control signals among A, B, C, D and which are at logical level 0. The voltage variation, equal to +V$_1$, at the output of the comparator is transferred from capacitor 25 to the direct input which tends to drop to negative voltage level equal to VR$_1$−V$_1$. Such voltage level is virtually locked to 0 and more precisely to 0.7 V by a diode 38 having the cathode connected to the direct input and the anode connected to ground. Then the voltage applied to the direct input starts to increase from level 0 owing to the current rising in resistor 23 and the cycle is repeated.

Figures 2A, 2B, 2C:
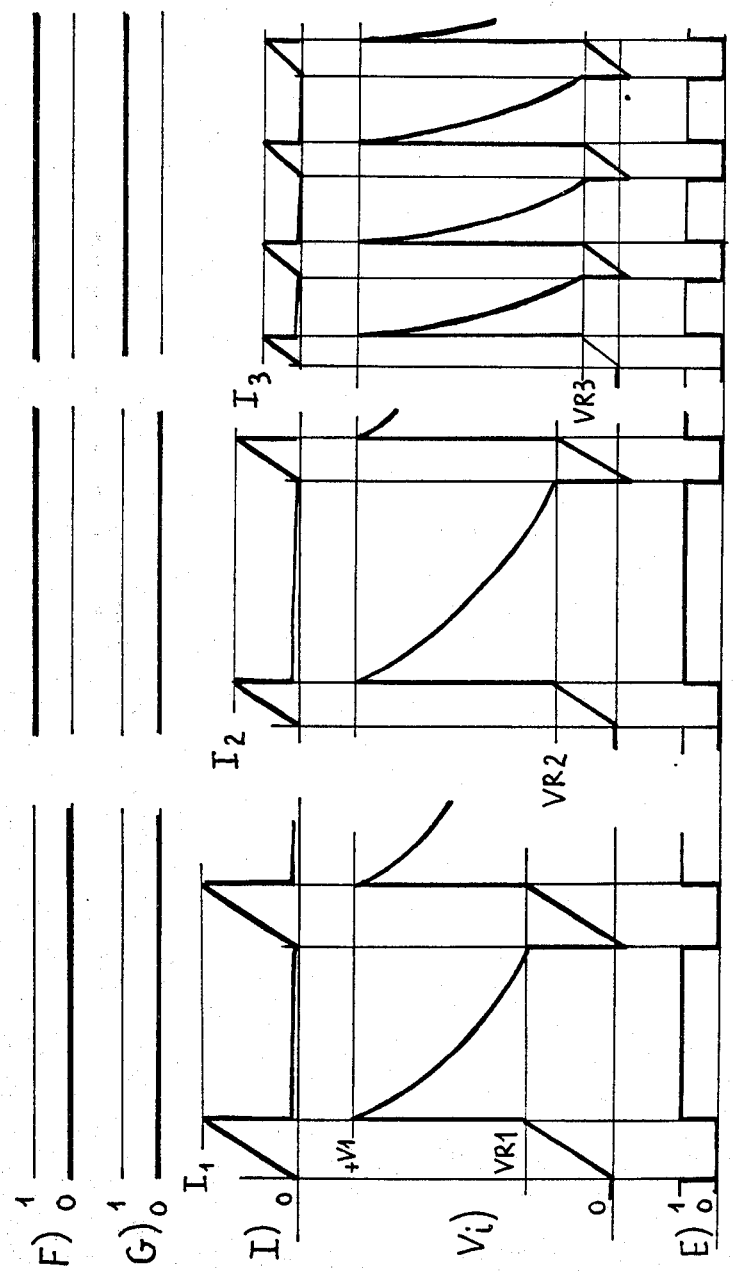
FIGS. 2A, 2B and 2C, show in timing diagram the level of the signals present in some points of the circuit of FIG. 1 for different operative conditions.

FIG. 2A shows in timing diagram format the operations above described. Diagrams F and G show the level of control signals F and G. Diagram I shows the current in resistor 23. Diagram Vi shows the voltage at the direct input of the comparator. Diagram E shows the signal in output from the comparator.

The effect of a command F at logical level 1 applied to NOT 35 input will now be considered. In such working condition resistor 32 is virtually connected to ground and therefore in parallel to resistor 28. The reference voltage applied to the inverting input will be therefore determined by the voltage divider comprised of resistor 30 and of two resistors 32 and 28 parallel connected. Consequently, such reference voltage will be $VR_2 < VR_1$. The operation of the energization current control circuit is identical to the previously described one, the only difference being that the current switching off in the conducting transistors occurs at a reference value $VR_2 < VR_1$ and therefore at a current value $I_2 < I_1$. (FIG. 2B shows the timing diagram of the behaviour under such conditions and it points out that the switching frequency is not substantially different in the two cases.) These two operative conditions may be conveniently used, the first one to control a step motor acceleration by applying high value current pulses to the winding and the second one to control the constant speed movement of the step motor, by current pulses having a lower maximum value $I_2$.

The case in which both command F and command G are at logical level 1 is now considered. In such working condition resistors 27, 31, 32 are virtually connected to ground (practically the voltage drop in NOT 33, 34, 35 may be easily recovered). Thus the reference voltage $VR_3$ applied to the inverting input is determined by the voltage divider, comprised of resistor 30 and three resistors 31, 32, 28 parallel connected, and it results $VR_3 < VR_2$. Besides, resistor 27 is parallel-connected to the series of two resistors 23 and 24 and constitutes, together with capacitor 25, an RC circuit with a time constant evidently lower than the one of a RC circuit formed by capacitor 25 and by the two resistors 23, 24 series connected, only. Consequently, the time interval necessary for capacitor 25 to charge and therefore for the comparator 26 to resume its rest condition after its activation, is shortened. The energization frequency of the phases is therefore increased and by a suitable choice of resistor 27 value it may be caused to be higher than the accoustic frequencies. (FIG. 2C shows the timing diagram for the circuit operation under such conditions.) Such working condition may be conveniently used to hold a step motor in a stable position by applying current pulses of limited maximum value $I_3$ at ultrasonic frequency, thus eliminating the inconvenient noise without causing power losses higher than the acceptable ones within the switching transistors. In conclusion, the energization current control circut for the phases of a step motor described with reference to FIG. 1 essentially provides for the follows:

(a) it limits, by "chopping", the energization current within predetermined values which are chosen according to different working conditions and requirements;

(b) it varies the "chopping" frequency depending on the working conditions and inversely to the controlled current.

It is to be noted that the described control circuit is only a preferred embodiment of the invention and that several changes may be made without departing from the spirit and scope of the invention. In the described control circuit the switching frequency is given by a RC network in a way independent from the electrical characteristics of the step motor phases. It is however clear that the function of RC network may be carried out by different circuital arrangements, such as the use of a monostable multivibrator with controllable time or of an oscillator with controllable frequency. It is further possible to use the step motor phase characteristics, particularly their time constant, to control the "chopping" frequency in a direct manner.

Figure 3:
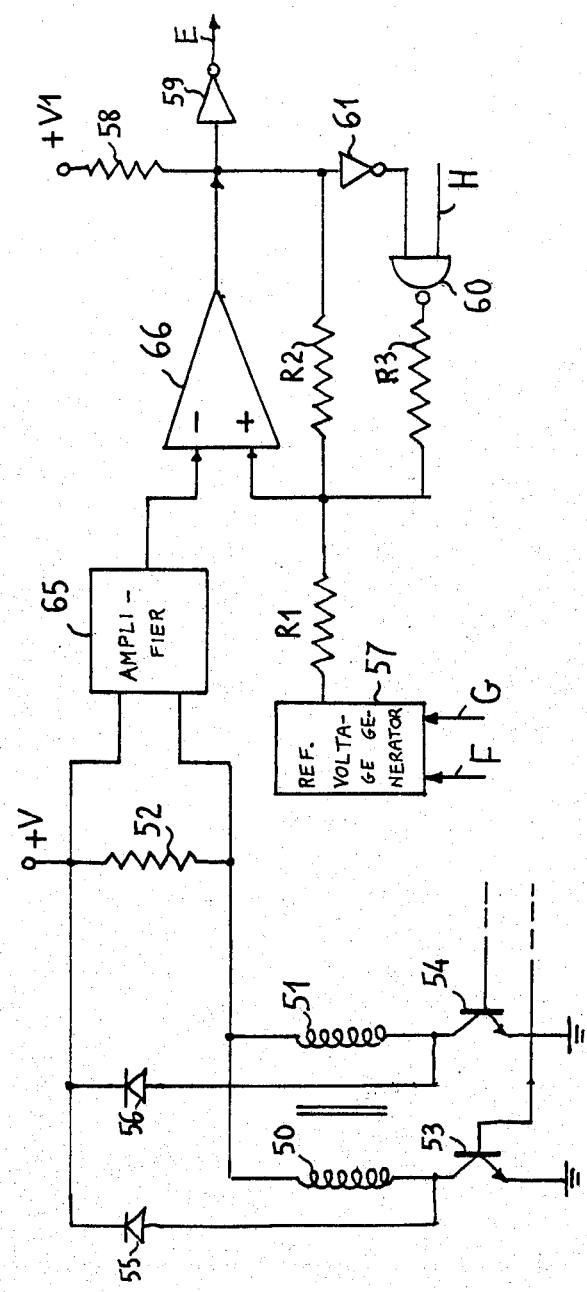
FIG. 3 shows a second control circuit working at variable frequency according to the invention.

Accordingly a second embodiment will now be described with reference to FIG. 3 which makes use of such concept. In FIG. 3 a step motor control circuit is shown according to the invention. In particular two phases 50, 51 are shown, which are connected, on one side to the voltage source +V, through a resistor 52, and on the other one to the collector of a switching transistor 53, 54, respectively. A recycle diode, 55, 56 respectively, connects the collector of the two transistors to the voltage source +V. The emitters of the two switching transistors are connected to ground. The other phases are connected in an identical manner and therefore they are not shown. The basis of the switching transistors are controlled by means of phase control circuits identical to the ones shown in FIG. 1, which therefore are not further shown and described.

The control circuit of the energization current is different as clearly shown in FIG. 3. This control circuit comprises an operational amplifier 65 with high common mode rejection rate, a comparator 66 of the "open collector" type, and a selectively variably reference voltage generator 57. The inputs of amplifier 65 are connected to resistor 52 ends. The function of amplifier 65 is the one to generate on its output, a voltage signal, relative to ground, amplified and proportional to the difference of potential at its inputs (Such amplifier is available on the market as an integrated circuit with code μA741.) The output of amplifier 65 is connected to the inverting input of comparator 66. The reference voltage generator 57 may be formed by a voltage divider with a partition ratio variable according to an outside control signal and formed by several resistors, as shown in the case of FIG. 1. The output of the reference voltage generator is connected to the direct input of comparator 66 through a resistor R1. A resistor R2 connected between the output and the direct input of comparator 66 provides a positive feedback. The comparator output is connected to a voltage tension +V1 through a pull up resistor 58. It is further connected to the NOR gates of the phase driving circuit, which are identical to those already seen in FIG. 1, and it applies to them the already seen control signal E through a NOT 59.

The operation of the current control circuit of FIG. 3 is rather different from the one in FIG. 1. In rest condition a null voltage is applied to the inverting input as current is not flowing in resistor 52. A positive reference voltage is applied to the direct input and therefore the comparator output is disconnected from ground and is at voltage level +V1. It is easy to verify that in case the possible reference voltage generated by generator 57 are $VR_1$, $VR_2$, $VR_3$, the threshold values actually present on the direct input are slightly higher. If two phases are now energized, a current begins to flow in resistor 52 and increases, according to an exponential law determined by the electrical characteristics of the phases. Such current causes a voltage drop within resistor 52 which is received and amplified by amplifier 65. For a certain value of the current in resistor 52, the potential at the inverting input of the comparator equals the voltage threshold present on the direct input. At this point the comparator switches, connecting the output to ground and de-energizing the already energized phases. In such conditions, the positive feedback generated by resistor R2, causes the lowering of the threshold voltage applied to the direct input which will be slightly lower than to the reference voltage generated by generator 57. Since a resistor R1 having a value much lower than the one of R2 can be used, whilst resistor 58 and generator 57 may have a negligible impedance, it is easy to verify that at first approximation the difference between the threshold voltage, upper and lower, applied to the direct input is $$V = (R1/R2) \cdot V$$

where V is the value of $+V1$ voltage and R1, R2 are the values of the two similar resistors. When comparator 66 is switched with the output connected to ground, a recycle current continues to flow in the phases as well as in resistor 52 through recycle diodes and it lowers, according to exponential law, until the voltage applied to the inverting input of comparator 66, by amplifier 65, is equal to the lower threshold voltage present on the direct input. This causes the switching of comparator 66. In a control circuit of such type the current switching frequency is essentially determined by the unchangeable time constant of the phase circuits and by the difference between the threshold voltages on the direct input. The higher such difference is, the lower the switching frequency will be, according to a law which in first approximation is of inverse ratio. As the difference between the two threshold voltage is given by the R1/R2 ratio it is clear that the "switching" frequency may be indirectly changed by modifying such ratio.

In FIG. 3 it is illustrated how this can be achieved. A resistor R3 is connected between the comparator direct input and the output of a two-input NAND gate 60 of the "open collector" type. An output of NAND 60 is connected to comparator 66 output, through a NOT 61. The second input of NAND 60 receives a control signal H. When H is at logical level 0 the output of NAND 60 is virtually disconnected and resistor R3 has no effect on the feedbacking circuit. When H is at logical level 1 and the comparator output is at logical level 0, resistor R3 is virtually connected to ground; that is, in parallel to resistor R2, thus increasing the positive feedback and further decreasing the lower threshold level applied to the direct input. When H is at logical level 1 and the comparator output is at logical level 1, resistor R3 is virtually disconnected and it has no consequence on the feedback circuit. It is therefore possible also with the circuit shown in FIG. 3 to control the energization current with high (ultrasonic) "switching" frequency for low values of the controlled current and with low "switching" frequency for higher values of the controlled current by suitably combining signal H with the selecting commands of reference voltage F, G sent to generator 57.

Having shown and described preferred embodiments of the invention, those skilled in the art will realize that many variations and modifications may be made to affect the described invention and still be within the scope of the claimed invention. It is the intention, therefore, to limit the invention only as indicated by the scope of the claims.

What is claimed is:

1. Step motor control circuit of the "current chopping" type comprising:
    current switching devices for intermittently applying an energization current to the motor phases;
    a comparator circuit having inverting and non-inverting inputs;
    a detector of the energization current applying a first detected signal, proportional to the detected current, to one input of said comparator circuit;
    a reference signal generator coupled to said comparator for supplying to the other input of said comparator circuit a reference signal selectable among a plurality of reference signals, said comparator circuit thus supplying a command signal for said switching devices to open said current switching devices when said first signal has a value equal to the reference signal, and to close them after a certain period;
    first circuit means, coupled to said comparator circuit for modifying the period for selectively turning off said current switching devices in inverse proportion to the magnitude of the reference signal applied to said comparator.

2. The control circuit as claimed in claim 1 wherein said first circuit means comprises an RC network, having a selectively variable time constant and further including a capacity feedback element connected between the output and the non-inverting input of said comparator, said non-inverting input receiving said first detected signal, said RC network also including a first resistive path connecting said non-inverting input to ground and a second resistive path selectively connecting said non-inverting input to ground.

3. The control circuit as claimed in claim 1 wherein said first circuit means comprises a resistive circuit having selectively variable positive feedback and further comprising a first positive feedback resistor connected between the output and the non-inverting input of said comparator, and a second resistor selectively connected in parallel to said first resistor.

* * * * *